US012222865B2

(12) United States Patent
Christiansen et al.

(10) Patent No.: US 12,222,865 B2
(45) Date of Patent: Feb. 11, 2025

(54) CACHE FOR IDENTIFIERS REPRESENTING MERGED ACCESS CONTROL INFORMATION

(71) Applicant: MICROSOFT TECHNOLOGY LICENSING, LLC, Redmond, WA (US)

(72) Inventors: Neal Robert Christiansen, Bellevue, WA (US); Neeraj Kumar Singh, Seattle, WA (US); Yanran Hao, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 61 days.

(21) Appl. No.: 18/325,355

(22) Filed: May 30, 2023

(65) Prior Publication Data

US 2024/0394192 A1 Nov. 28, 2024

Related U.S. Application Data

(60) Provisional application No. 63/503,933, filed on May 23, 2023.

(51) Int. Cl.
*G06F 12/08* (2016.01)
*G06F 12/0817* (2016.01)
*G06F 12/0877* (2016.01)

(52) U.S. Cl.
CPC ...... *G06F 12/0877* (2013.01); *G06F 12/0817* (2013.01)

(58) Field of Classification Search
CPC ... G06F 12/08; G06F 12/0817; G06F 12/0877
See application file for complete search history.

(56) References Cited

U.S. PATENT DOCUMENTS 7,599,937 B2   10/2009   Dutta et al.
2005/0086536 A1   4/2005   Wu
(Continued)

FOREIGN PATENT DOCUMENTS

WO         2007080562 A1      7/2007
WO     WO-2015172352 A1 *  11/2015 ............. G06F 21/57

OTHER PUBLICATIONS

P. Liu, L. Fang, M. C. Huang, Q. Hu and G. Jiang, "Building Expressive and Area-Efficient Directories with Hybrid Representation and Adaptive Multi-Granular Tracking," in IEEE Transactions on Computers, vol. 65, No. 3, pp. 847-859, Mar. 1, 2016.*
(Continued)

*Primary Examiner* — Pierre Michel Bataille
(74) *Attorney, Agent, or Firm* — Newport IP, LLC; Jacob P. Rohwer

(57) ABSTRACT

The system described herein introduces a cache that a file system uses to determine, for a current object, if the process to merge different types of access control information into merged access control information has already been performed for a previous object. Stated alternatively, the file system uses the cache to determine whether a current object being processed for storage has the same combination of access control information as a previous object that has already been processed for storage. If the current object has the same combination of access control information as the previous object, the file system is able to associate merged access control information for the previous object with the current object via the use of a pointer. Consequently, the file system avoids having to perform the resource-intensive process of merging the different types of access control information for the current object.

20 Claims, 5 Drawing Sheets

(56) References Cited

U.S. PATENT DOCUMENTS

| | | |
|---|---|---|
| 2007/0039045 A1 | 2/2007 | Mckee et al. |
| 2007/0208946 A1 | 9/2007 | Baby et al. |
| 2013/0339406 A1 | 12/2013 | Kanfi |
| 2014/0317279 A1* | 10/2014 | Roper .................... H04L 45/70 709/224 |
| 2016/0371145 A1* | 12/2016 | Akutsu .................. G06F 3/067 |
| 2018/0121126 A1* | 5/2018 | Song ................... G06F 12/1045 |
| 2021/0266346 A1* | 8/2021 | Gordon ............... H04L 63/0245 |

OTHER PUBLICATIONS

A. H. Karp and V. Sarkar, "Data merging for shared-memory multiprocessors," [1993] Proceedings of the Twenty-sixth Hawaii International Conference on System Sciences, Wailea, HI, USA, 1993, pp. 244-256.*

"FileNet P8 Platform-Security", Retrieved From: https://www.ibm.com/docs/en/filenet-p8-platform/5.5.x?topic=guide-security, Feb. 9, 2023, 24 Pages.

Russon, et al., "NTFS Documentation", Retrieved From: https://web.archive.org/web/20120425231402/http://www.dubeyko.com/development/FileSystems/NTFS/ntfsdoc.pdf, Apr. 25, 2012, 138 Pages.

International Search Report and Written Opinion received for PCT Application No. PCT/US2024/030142, Sep. 10, 2024, 13 pages.

* cited by examiner

```
                                                              ┌── 300

┌─────────────────────────────────────────────────────────────────────────────┐
│ RECEIVE, FROM AN APPLICATION, A REQUEST TO STORE AN OBJECT IN A DIRECTORY,  │
│ WHEREIN THE OBJECT IS ASSOCIATED WITH A FIRST IDENTIFIER REPRESENTING       │
│ FIRST ACCESS CONTROL INFORMATION AND A SECOND IDENTIFIER REPRESENTING       │
│ SECOND ACCESS CONTROL INFORMATION                                           │
│                                 302                                         │
└─────────────────────────────────────────────────────────────────────────────┘
                                      │
                                      ▼
┌─────────────────────────────────────────────────────────────────────────────┐
│ CREATE, FOR THE OBJECT, A FIRST MERGED IDENTIFIER BASED ON THE FIRST        │
│ IDENTIFIER AND THE SECOND IDENTIFIER                                        │
│                                 304                                         │
└─────────────────────────────────────────────────────────────────────────────┘
                                      │
                                      ▼
┌─────────────────────────────────────────────────────────────────────────────┐
│ DETERMINE THAT AN ENTRY IN A CACHE INCLUDES A SECOND MERGED IDENTIFIER      │
│ THAT MATCHES THE FIRST MERGED IDENTIFIER                                    │
│                                 306                                         │
└─────────────────────────────────────────────────────────────────────────────┘
                                      │
                                      ▼
┌─────────────────────────────────────────────────────────────────────────────┐
│ ASSOCIATE THE OBJECT WITH MERGED ACCESS CONTROL INFORMATION IN THE ENTRY    │
│ IN THE CACHE USING A POINTER, THE MERGED ACCESS CONTROL INFORMATION         │
│ HAVING ALREADY BEEN CREATED FOR ANOTHER OBJECT BASED ON THE FIRST ACCESS    │
│ CONTROL INFORMATION AND THE SECOND ACCESS CONTROL INFORMATION               │
│                                 308                                         │
└─────────────────────────────────────────────────────────────────────────────┘
                                      │
                                      ▼
┌─────────────────────────────────────────────────────────────────────────────┐
│             STORE THE FILE IN THE DIRECTORY WITH THE POINTER                │
│                                 310                                         │
└─────────────────────────────────────────────────────────────────────────────┘
```

FIG. 3

CACHE FOR IDENTIFIERS REPRESENTING MERGED ACCESS CONTROL INFORMATION

PRIORITY APPLICATION

The present application is a non-provisional application of, and claims priority to, U.S. Provisional Application Ser. No. 63/503,933 filed on May 23, 2023, entitled: CACHE FOR IDENTIFIERS REPRESENTING MERGED ACCESS CONTROL INFORMATION, the contents of which are hereby incorporated by reference in their entirety.

BACKGROUND

An operating system of a computing device (e.g., a server, a desktop computer, a laptop computer) is configured to interact with a file system to perform operations in association with files stored on a storage device (e.g., open a file, delete a file, write to a file, read from a file, replace a file, copy a file, move a file, search for a file, create a file). A file system is configured as a hierarchical structure that includes nodes representing objects, e.g., directories and/or files (e.g., a document, an executable, a spreadsheet, an image, a video). Moreover, a file system comprises logic that enables navigation through the nodes to locate an object and to perform an operation in association with the object.

An object that is in the process of being created within a directory tree, and therefore, written to a storage device typically includes different types of access control information. A directory tree is an identifiable structure that includes a plurality of nodes that represent multiple directories and/or multiple files located in the multiple directories. Access control information defines users that can access an object and/or additional operations the defined users are authorized to perform on the object (e.g., modify content of the file, delete the file). Access control information can include access control lists and/or security descriptors that specify access control entries. A first example type of access control information associated with a user (e.g., derived from a token associated with the user) executing an application that requests the creation and/or modification of an object. A second example type of access control information is inherited from the file system (e.g., a directory in which the object is being stored includes access control information that may be automatically passed to certain objects stored in the directory). A third example type of access control information is defined by a user for an object that is being created and/or modified. That is, the user creating and/or modifying the object can define other users to which access to the object is provided and/or additional operations the other users are authorized to perform on the object.

Conventionally, the file system performs a process to merge the different types of access control information included in an object into merged access control information. This process to merge the different types of access control information is performed for each object to be created and/or stored in a directory tree. The process to merge the different types of access control information for an individual object includes an allocation operation and an inspection operation.

More specifically, the file system is required to implement a memory allocator call and, in response, the file system receives allocated memory in which individual access control entries of an instance of access control information are stored. After the memory is allocated and the access control information is stored, a security module of the file system parses through all the access control entries to inspect (e.g., compare) the content (e.g., defined users, defined groups, allowed operations) and merge the content. Accordingly, the resources required to allocate memory and inspect the access control entries is relative to a number and/or a size (e.g., number of bytes that need to be stored) of the access control entries in an instance of access control information. That is, as the number and/or the size of the access control entries in an instance of access control information increases, the amount of memory to be allocated and inspected also increases.

In situations where a large amount of objects are created and stored in a directory tree in a short amount of time (e.g., thousands of source code files are created and stored in a distributed version control repository as part of a project build), the aforementioned process to merge the different types of access control information into merged access control information, on a per object basis, becomes a performance bottleneck for the file system. It is with respect to these and other technical challenges that the disclosure made herein is presented.

SUMMARY

The system described herein implements a cache that a file system can use to determine, for a current object, if the process to merge the different types of access control information into merged access control information has already been performed for a previous object. Stated alternatively, the file system uses the cache to determine whether a current object being processed for storage has the same combination of access control information as a previous object that has already been processed for storage. If the current object being processed for storage has the same combination of access control information as the previous object that has already been processed for storage, the file system is able to associate, e.g., via a pointer, the merged access control information created for the previous object with the current object. Consequently, the file system can avoid having to perform the resource-intensive process of merging the different types of access control information for the current object being processed for storage.

As described in more detail below, the file system creates a cache. The cache can be associated with a directory tree established to organize and store a large number of objects. For example, the directory tree may be created to temporarily store thousands of source code files in a number of directories defined by a distributed version control repository as part of a project build. Accordingly, the file system receives requests to create and/or store the objects in the directory tree. The requests can be received from a single application or multiple applications. As described above, a current object that is in the process of being stored in the directory tree (e.g., written to allocated storage) typically includes different types of access control information represented by different identifiers.

More specifically, the current object includes a first identifier representing a first type of access control information. In one example, the first type of access control information is associated with a user of the application (e.g., derived from a token associated with the user) from which the request to store the current object is received. The current object further includes a second identifier representing a second type of access control information. In one example, the second identifier and/or the second type of access control information are inherited from a parent directory in which the current object (e.g., a file, a child directory) is being stored. An identifier representing a type of access control information can be a number, a string of alphanumeric characters, or any other format usable for identification purposes.

The file system is configured to create, based at least on the first and second identifiers, a merged identifier for the current object. In one example, the file system creates the merged identifier by providing the first and second identifiers as inputs to a hash algorithm, and receiving an output of the hash algorithm. The output of the hash algorithm is the merged identifier. The file system then checks the cache to determine if the merged identifier created for the current object matches a merged identifier already created for a previous object. For instance, the file system is configured to iterate through entries in the cache until a matched merged identifier is located. Locating a matched merged identifier is alternatively referred to as a cache hit. A matched merged identifier indicates that the file system has already created merged access control information based on the first type of access control information represented by the first identifier and the second type of access control information represented by the second identifier. Stated alternatively, a matched merged identifier indicates that the file system already encountered the same combination of access control information in a previous object that has already been processed for storage in the directory tree.

Consequently, the file system is able to use the merged access control information for the current object rather than perform a redundant merge process that includes the allocation and inspection operations specified above. The performance of the file system is greatly improved because merging the same combination of access control information over and over again for a set of objects is avoided. For example, it is not uncommon for a copy of a repository associated with a directory tree that contains thousands of directories and/or files to include a small number of cache entries (e.g., three, four, five) with unique merged access control information. Thus, only a small number (e.g., three, four, five) of merge processes need to be performed by the file system in a short amount of time when the copy of the repository associated with the directory tree is created (e.g., "git cloning").

If the file system is unable to locate a matching merged identifier in the cache for the current object (e.g., there is no cache hit), the file system creates the merged access control information for the current object by merging the first access control information represented by the first identifier and the second access control information represented by the second identifier. The file system then adds the merged identifier and the merged access control information to an entry in the cache.

In various examples, an object is further associated with a third identifier representing a third type of access control information. As described above, the third type of access control information is defined by a user for the object. That is, the user creating and/or storing the object can define other users to which access to the object is provided and/or additional operations the other users are authorized to perform on the object. Accordingly, the merged identifier can be created based on the first identifier, the second identifier, and the third identifier. Moreover, the merged access control information can be created by merging the first access control information, the second access control information, and the third access control information. The third identifier may be a null identifier indicating that the third access control information defined by a user for the object is not present. If the third identifier is the null identifier, then the file system proceeds to check the cache using only the first and second identifiers, as described above.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 3 is an example flow diagram showing aspects of a method for avoiding redundant merges of different types of access control information in a file system.

DETAILED DESCRIPTION

The techniques described herein introduce a cache that a file system can use to determine, for a current object, if the process to merge the different types of access control information into merged access control information has already been performed for a previous object. Stated alternatively, the file system uses the cache to determine whether a current object being processed for storage has the same combination of access control information as a previous object that has already been processed for storage. If the current object being processed for storage has the same combination of access control information as the previous object that has already been processed for storage, the file system is able to associate, e.g., via a pointer, the merged access control information created for the previous object with the current object. Consequently, the file system can avoid having to perform the resource-intensive process of merging the different types of access control information for the current object being processed for storage.

Various examples, scenarios, and aspects that enable the techniques described herein are described below with respect to FIGS. 1-4.

Figure 1:
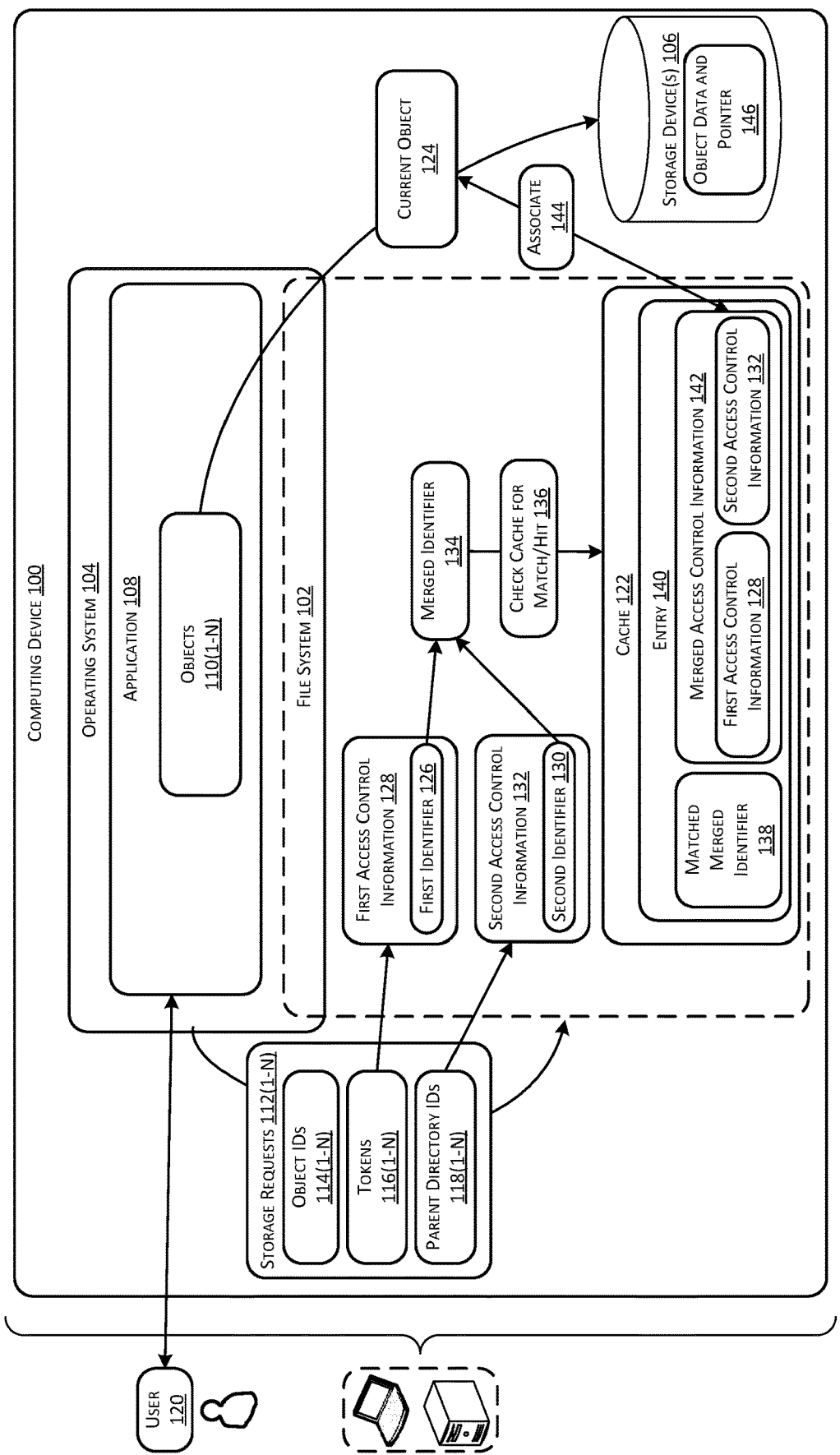
FIG. 1 illustrates an example computing device executing a file system that implements a cache usable to determine, for a current object, if the process to merge the different types of access control information into merged access control information has already been performed for a previous object.

FIG. 1 illustrates an example computing device 100 executing a file system 102 that implements a cache usable to determine, for a current object, if the process to merge the different types of access control information into merged access control information has already been performed for a previous object. The computing device 100 can be a server computer, a desktop computer, a laptop computer, etc. Therefore, the computing device 100 includes an operating system 104 that is configured to interact with the file system 102 to perform operations in association with objects (e.g., directories and/or files) stored on storage device(s) 106, such as a hard disk drive, an optical disc drive, and so forth.

As mentioned above, the file system 102 is configured as a hierarchical structure that includes nodes representing directories and/or files. A portion of the directories and/or files may be associated with an identifiable directory tree. Moreover, the file system 102 comprises logic that enables navigation through the nodes to locate a directory or a file (e.g., a document, an executable, a spreadsheet, an image, a video) and to perform an operation in association with the directory or the file. In association with the techniques described herein, the operating system 104 executes an application 108 (e.g., an operating system application, a third-party application installed on the computing device 100) that wants to create and/or store a large number of objects 110(1-N), wherein N represents hundreds or even thousands of objects. Accordingly, the application 108 sends storage requests 112(1-N) in order to store the respective objects 110(1-N) in storage device(s) 106.

The storage requests 112(1-N) include object identifications 114(1-N), tokens 116(1-N), and parent directory identifications 118(1-N). The object identifications 114(1-N) are different as the objects 110(1-N) are different objects. However, the tokens 116(1-N) and the parent directory identifications 118(1-N) may be the same for a group of the objects 110(1-N). For example, the tokens 116(1-N) represent both the application 108 (e.g., an application identification) and a user 120 (e.g., a user identification) that initiates the storage requests 112(1-N) via the application 108, and thus, each instance of the token 116 passed to the file system 102 with the storage requests 112(1-N) is the same in many scenarios. A token 116 contains security information about the user from which the access control information can be derived.

In one example, the storage requests 112(1-N) are issued to the file system 102 when a directory tree is created to temporarily store thousands of source code files in a distributed version control repository as part of a project build. A directory tree includes a plurality of nodes that represent multiple directories and/or multiple files located in the multiple directories. The directories and/or files in a directory tree are located under a parent (e.g., root) directory at the top of the directory tree. Accordingly, the parent directory identifications 118(1-N) are associated with directories in the directory tree.

In association with the directory tree being created and/or copied (e.g., at the onset of the storage requests 112(1-N) being issued), the file system 102 creates a cache 122. As described below, the cache 122 is a mechanism used by the file system 102 to avoid redundant merging of access control information. As described above, a current object 124 (e.g., one of objects 110(1-N) that is in the process of being stored in the directory tree (e.g., written to allocated storage in a storage device 106) typically includes different types of access control information represented by different identifiers.

More specifically, the current object 124 includes a first identifier 126 representing first access control information 128. As shown in the example of FIG. 1, the first access control information 128 is derived from the respective token 116(1-N) included in the storage request for the current object 124. In various examples, the respective token 116 (1-N) includes an impersonation attribute that may alter the first identifier 126. The impersonation attribute reflects a level at which a service is authorized to adopt the identity of the user 120.

The current object 124 further includes a second identifier 130 representing second access control information 132. As shown in the example of FIG. 1, the second identifier 130 and/or the second type of access control information 132 are inherited from the parent directory in which the current object 124 is being stored, which is determined by the respective parent directory identification 118(1-N) included in the respective storage request 112(1-N) for the current object 124. An identifier representing access control information can be a number, a string of alphanumeric characters, or any other format usable for identification purposes.

The file system 102 is configured to create, based at least on the first identifier 126 and the second identifier 130, a merged identifier 134 for the current object 124. The file system 102 then checks 136 the cache 122 to determine if the merged identifier 134 created for the current object 124 matches a merged identifier 138 already created for a previous object that has been stored. For instance, the file system 102 is configured to iterate through entries in the cache 122 until an entry 140 with the matched merged identifier 138 is located. Locating the entry 140 with the matched merged identifier 138 is alternatively referred to as a cache hit. A matched merged identifier 138 indicates that the file system 102 has already created merged access control information 142 based on the first access control information 128 represented by the first identifier 126 and the second access control information 132 represented by the second identifier 130. Stated alternatively, the matched merged identifier 138 indicates that the file system 102 already encountered the same combination of access control information 128, 132 in a previous object that has already been processed for storage.

Consequently, the file system 102 is able to associate 144 the merged access control information 142 in the cache 122 with the current object 124 rather than perform a redundant merge process that includes the allocation and inspection operations. For example, the current object 124 is stored as object data with a pointer to the merged access control information 142 in the cache 122, as shown via element 146 in FIG. 1. Accordingly, entries in the cache 122 (e.g., entry 140) represent objects in memory and each entry includes a reference count that is incremented for each stored object (e.g., the current object 124) that points to the entry, or the respective object represented by the entry. Consequently, the performance of the file system 102 is greatly improved because merging the same combination of access control information over and over again for a set of files is avoided.

Figure 2A:
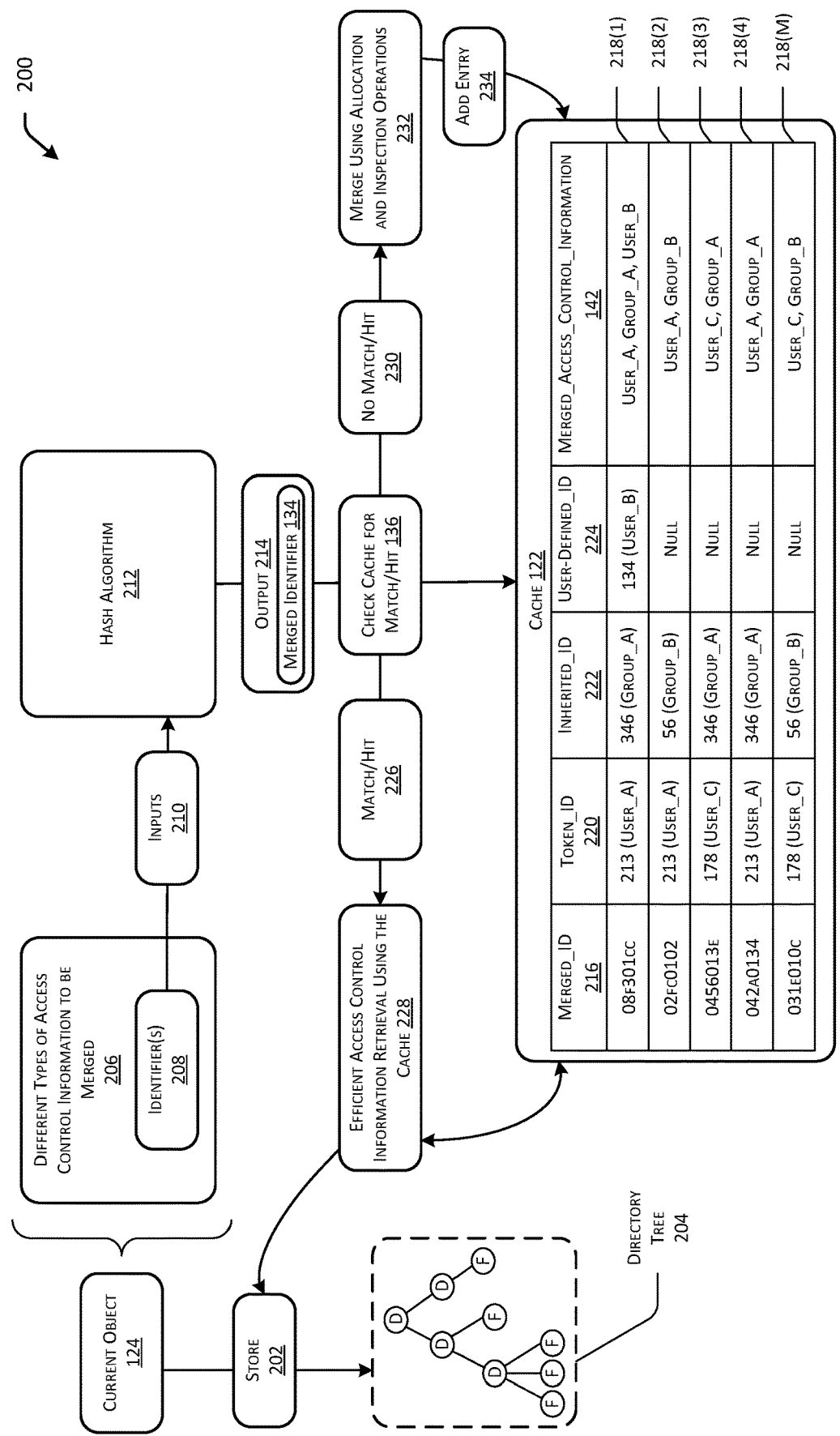
FIG. 2A illustrates an example diagram that captures different approaches to storing a current object with merged access control information based on whether or not a cache hit occurs.

FIG. 2A illustrates an example diagram 200 that captures different approaches to storing 202 a current object 124 in a directory tree 204 with merged access control information 142 based on whether or not a cache hit occurs. A node labeled "D" in the directory tree 204 is a directory node and a node labeled "F" in the directory tree 204 is a file node.

As illustrated, the current object 124 is associated with different types of access control information to be merged 206. One example type of access control information is associated with a user that issued the storage request (e.g., derived from a token included in the storage request) for the current object 124. Another example type of access control information is inherited from the parent directory in which the current object 124 is being stored. Yet another example type of access control information is defined by a user 120 for the current object 124. That is, the user 120 creating and/or storing the current object 124 can define other users to which access to the current object 124 is provided and/or additional operations the other users are authorized to perform on the current object 124.

Each of the different types of access control information to be merged 206 is associated with an identifier, and thus, FIG. 2A includes an element that represents multiple identifiers 208 for the different types of access control information to be merged 206. In various embodiments, the file system 102 provides the identifiers 208 as inputs 210 to a hash algorithm 212. The hash algorithm 212 can be any type of hash algorithm 212 (e.g., MD2, MD4, MD5, SHA-256, SHA-384, SHA-512, Adler-32, CRC-32) that produces a hash output 214 that serves as the merged identifier 134 for the file system 102.

After the merged identifier 134 is created for the current object 124, the file system 102 checks 136 the cache 122 to determine if the merged identifier 134 matches any of the merged identifiers 216 listed in the cache entries 218(1-M), where M is an integer number (e.g., two, three, four, five, ten, twenty, one hundred). The cache entries 218(1-M) illustrated in FIG. 2A are provided for each of discussion and to show different combinations of access control information to be merged.

For example, cache entry 218(1) includes a merged identifier 216 of "08f301cc" which is an output 214 based on inputs 210 that include a token identifier 220 of "213" (representing "User_A"), an inherited identifier 222 of "346" (representing "Group_A"), and a user-defined identifier 224 of "134" (representing "User_B"). Accordingly, cache entry 218(1) includes merged access control information 142 that represents a combination of "User_A", "Group_A", and "User_B" (e.g., access control entries listed for "User_A", "Group_A", and "User_B"). Cache entry 218(2) includes a merged identifier 216 of "02fc0102" which is an output 214 based on inputs 210 that include a token identifier 220 of "213" (representing "User_A") and an inherited identifier 222 of "56" (representing "Group_B"). For cache entry 218(2-M), the user-defined identifier 224 is "null" and thus is not provided as an input 210 to the hash algorithm 212. Accordingly, cache entry 218(2) includes merged access control information 142 that represents a combination of "User_A" and "Group_B". Cache entry 218(3) includes a merged identifier 216 of "0456013e" which is an output 214 based on inputs 210 that include a token identifier 220 of "178" (representing "User_C") and an inherited identifier 222 of "346" (representing "Group_A"). Accordingly, cache entry 218(3) includes merged access control information 142 that represents a combination of "User_C" and "Group_A". Cache entry 218(4) includes a merged identifier 216 of "042a0134" which is an output 214 based on inputs 210 that include a token identifier 220 of "213" (representing "User_A") and an inherited identifier 222 of "346" (representing "Group_A"). Accordingly, cache entry 218(4) includes merged access control information 142 that represents a combination of "User_A" and "Group_A". Finally, cache entry 218(M) includes a merged identifier 216 of "031e010c" which is an output 214 based on inputs 210 that include a token identifier 220 of "178" (representing "User_C") and an inherited identifier 222 of "56" (representing "Group_B"). Accordingly, cache entry 218(M) includes merged access control information 142 that represents a combination of "User_C" and "Group_B".

The merged identifiers 216 listed in cache entries 218(1-M) have already been created by the file system 102 for previous objects that were stored in the directory tree 204 before the current object 124. Thus, the file system 102 is configured to iterate through the cache entries 218(1-M) until a merged identifier 216 in the cache 122 is found to match the merged identifier 134 created for the current object 124 (e.g., the matched merged identifier 138 in FIG. 1), resulting in a cache hit. As described above, if there is a match/hit 226 in the cache 122, the file system 102 implements efficient access control information association using the cache 122 (e.g., the current object 124 is stored 202 with a pointer to an object represented by the matched cache entry). That is, the file system 102 stores 202 the current object 124 in the directory tree 204 with a pointer to an object represented by the matched cache entry.

If there is a not match/hit 230 in the cache 122, the file system 102 creates the merged access control information 142 for the current object 124 by merging the different types of access control information 206 represented by the identifiers 208 using the conventional allocation and inspection operations 232. The file system 102 then adds 234 the merged identifier 134 and the merged access control information to a new entry in the cache 122. Moreover, the file system 102 stores 202 the current object 124 in the directory tree 204 with a pointer to an object represented by the newly created cache entry.

Figure 2B:
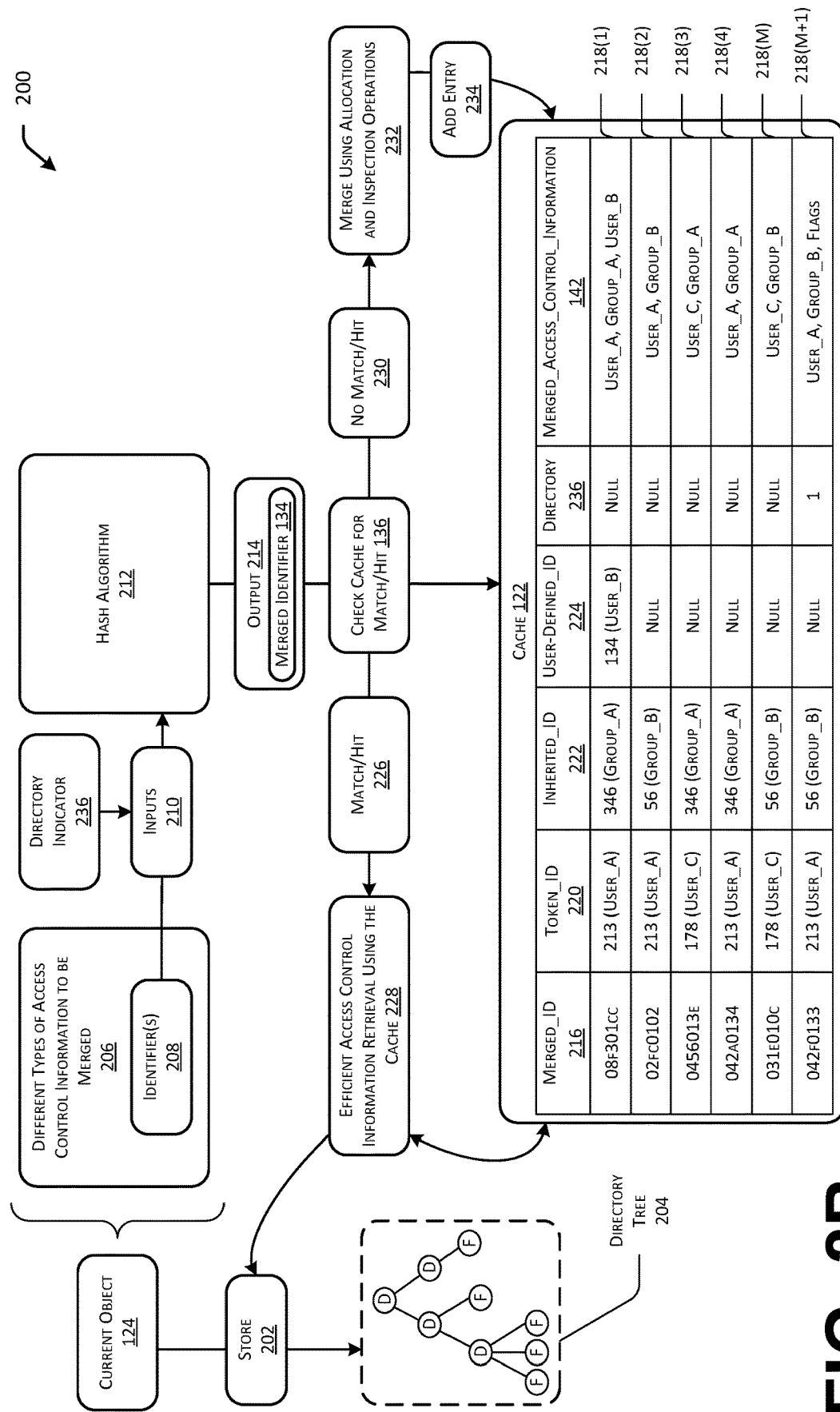
FIG. 2B illustrates the example diagram of FIG. 2A where the inputs to the hash algorithm include an indication of whether the object is a directory.

FIG. 2B illustrates the example diagram of FIG. 2A where the inputs 210 to the hash algorithm 212 include an indicator 236 of whether the current object 124 is a directory. In various embodiments, the merging of access control information is different for directories and files. For instance, each access control entry to be merged in association with a directory includes a flag indicating whether the access control entry is inherited by the directory from the parent directory. Consequently, a directory being created and/or stored as a child directory in a parent directory may not need to inherit all the access control information from the parent directory. In contrast, a file stored in the same parent directory may need to inherit all the access control information from the parent directory. Thus, even though the identifier(s) 208 for the child directory and the file are the same, the merged access control information 142 for the child directory and the file being stored in the same parent directory may be different.

As shown in FIG. 2B, the cache 122 includes a new column that tracks the directory indicator 236. If the current object 124 is a file and not a directory, the directory indicator 236 is null and does not need to be taken into account when hashing the inputs 210. However, a new cache entry 218 (M+1) in the cache 122 includes the same token identifier 220, inherited identifier 222, and user-defined identifier 224 as entry 218(2), except the directory indicator 236 indicates the object is a directory (e.g., the value is set to "1") and not a file. Cache entry 218(M+1) includes a merged identifier 216 of "042f0133" which is an output 214 based on inputs 210 that include a token identifier 220 of "213" (representing "User_A"), an inherited identifier 222 of "56" (representing "Group_B"), and a directory indicator 236 of "1". Accordingly, cache entry 218(M+1) includes merged access control information 142 that represents a combination of "User_A" and "Group_B" while considering flags indicating whether access control entries are inherited by the directory.

Turning now to FIG. 3, an example flow diagram 300 of a method for avoiding redundant merges of different types of access control information in a file system is illustrated.

At operation 302, the file system receives, from an application, a request to store an object in a directory. The object is associated with a first identifier representing first access control information and a second identifier representing second access control information. For example, the first access control information is associated with a user of the application from which the request is received and the second access control information is inherited from the directory in which the object is stored.

At operation 304, the file system creates, for the object, a first merged identifier based on the first identifier and the second identifier. For example, the file system provides the first identifier and second identifier as inputs to a hash algorithm and receives the first merged identifier as an output from the hash algorithm.

At operation 306, the file system determines that an entry in a cache includes a second merged identifier that matches the first merged identifier.

At operation 308, the file system associates the object with merged access control information in the entry in the cache using a pointer. The merged access control information is based on the first access control information and the second access control information. Moreover, the merged access control information is associated with another object (e.g., the merged access control information was previously created for the other object).

At operation 310, the file system stores the object in the directory with the pointer.

For ease of understanding, the method discussed in this disclosure is delineated as separate operations represented as independent blocks. However, these separately delineated operations should not be construed as necessarily order dependent in their performance. The order in which the method is described is not intended to be construed as a limitation, and any number of the described blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Figure 4:
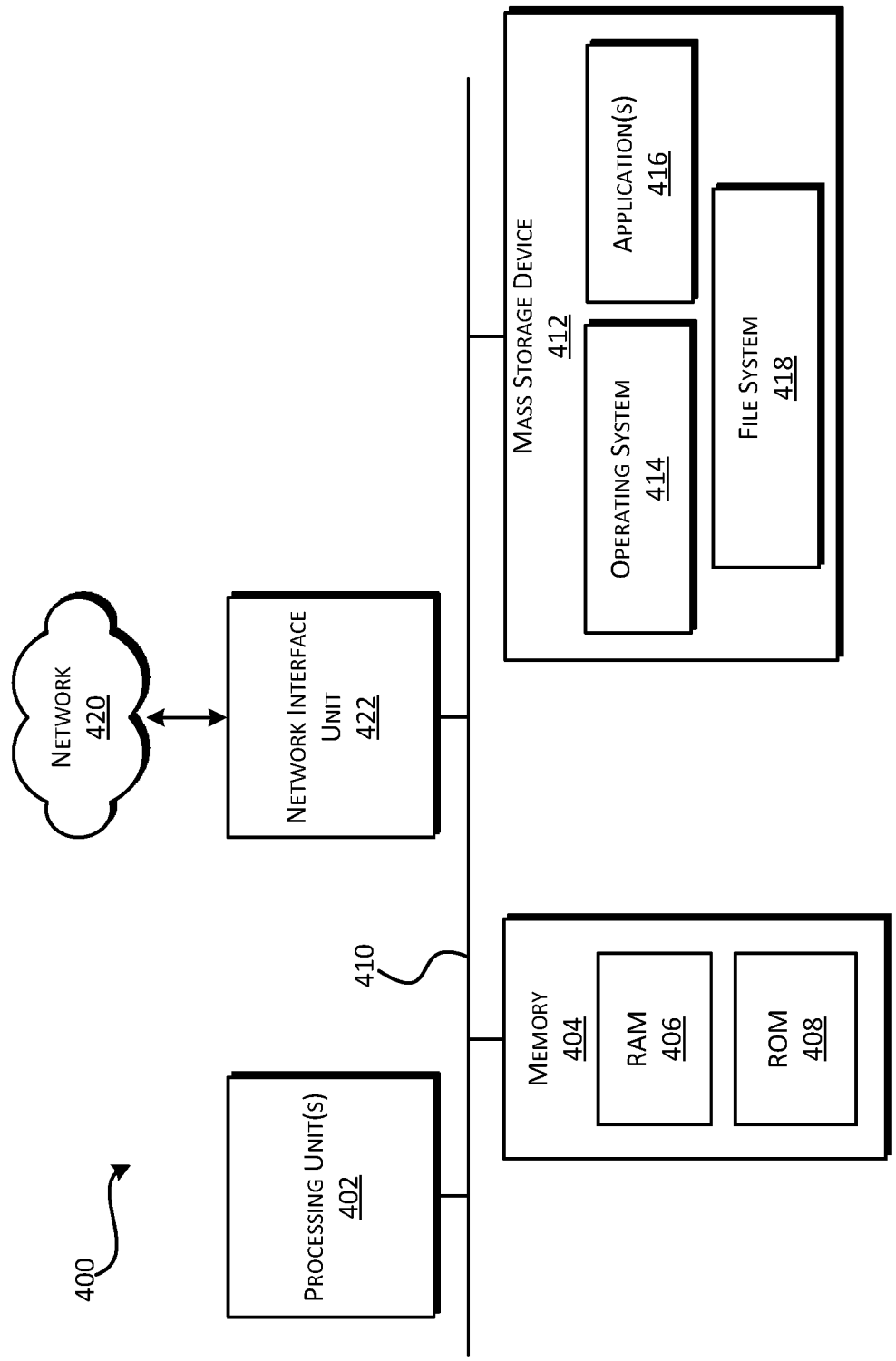
FIG. 4 is a computer architecture diagram showing an illustrative computer hardware and software architecture for a computing system capable of implementing aspects of the techniques and technologies presented herein.

FIG. 4 shows additional details of an example computer architecture 400 for a device, such as a computer or a server capable of executing computer-readable instructions. The computer architecture 400 illustrated in FIG. 4 includes processing unit(s) 402, a system memory 404, including a random-access memory 406 (RAM) and a read-only memory (ROM) 408, and a system bus 410 that couples the memory 404 to the processing unit(s) 402. The processing unit(s) 402 may also comprise or be part of a processing system. In some embodiments, the processing system is contained in a single device. In various examples, the processing system is distributed. Stated another way, one processing unit of the processing system may be located in a first device in a first location (e.g., a rack within a datacenter) while another processing unit of the processing system is located in a second device in a second location separate from the first location.

Processing unit(s), such as processing unit(s) 402, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 400, such as during startup, is stored in the ROM 408. The computer architecture 400 further includes a mass storage device 412 for storing an operating system 414, application(s) 416, a file system 418, and other data described herein.

The mass storage device 412 is connected to processing unit(s) 402 through a mass storage controller connected to the bus 410. The mass storage device 412 and its associated computer-readable media provide non-volatile storage for the computer architecture 400. Although the description of computer-readable media contained herein refers to a mass storage device, it should be appreciated by those skilled in the art that computer-readable media can be any available computer-readable storage media or communication media that can be accessed by the computer architecture 400.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 400 may operate in a networked environment using logical connections to remote computers through the network 420. The computer architecture 400 may connect to the network 420 through a network interface unit 422 connected to the bus 410.

It should be appreciated that the software components described herein may, when loaded into the processing unit(s) 402 and executed, transform the processing unit(s) 402 and the overall computer architecture 400 from a general-purpose computing system into a special-purpose computing system customized to facilitate the functionality presented herein. The processing unit(s) 402 may be constructed from any number of transistors or other discrete circuit elements, which may individually or collectively assume any number of states. More specifically, the processing unit(s) 402 may operate as a finite-state machine, in response to executable instructions contained within the software modules disclosed herein. These computer-executable instructions may transform the processing unit(s) 402 by specifying how the processing unit(s) 402 transition between states, thereby transforming the transistors or other discrete hardware elements constituting the processing unit(s) 402.

The disclosure presented herein also encompasses the subject matter set forth in the following clauses.

Example Clause A, a method to avoid redundant merges of different types of access control information in a file system, comprising: receiving, from an application, a request to store an object in a directory, wherein the object is associated with a first identifier representing first access control information and a second identifier representing second access control information; creating, for the object, a first merged identifier based on the first identifier and the second identifier; determining that an entry in a cache includes a second merged identifier that matches the first merged identifier; in response to determining that the entry in the cache includes the second merged identifier, associating the object with merged access control information in the entry in the cache using a pointer, wherein: the merged access control information is based on the first access control information and the second access control information; and the merged access control information is associated with another object; and storing the object in the directory with the pointer.

Example Clause B, the method of Example Clause A, wherein the first access control information is associated with a user of the application from which the request is received.

Example Clause C, the method of Example Clause A or Example Clause B, wherein the second access control information is inherited from the directory in which the object is stored.

Example Clause D, the method of any one of Example Clauses A through C, wherein creating the first merged identifier comprises: providing the first identifier and second identifier as inputs to a hash algorithm; and receiving the first merged identifier as an output from the hash algorithm.

Example Clause E, the method of Example Clause D, wherein the inputs include an indicator that the object is a directory and not a file.

Example Clause F, the method of any one of Example Clauses A through E, wherein: the object is associated with a third identifier representing third access control information; the merged access control information is created by merging the first access control information, the second access control information, and the third access control information; and the first merged identifier is created based on the first identifier, the second identifier, and the third identifier.

Example Clause G, the method of Example Clause F, wherein the third access control information is defined by a user of the application from which the request is received.

Example Clause H, the method of any one of Example Clauses A through G, further comprising: receiving, from the application, a prior request to store the other object in the directory, wherein the other object is associated with the first identifier representing the first access control information and the second identifier representing the second access control information; creating, for the other object, the second merged identifier based on the first identifier and the second identifier; determining that entries in the cache do not include the second merged identifier; in response to determining that the entries in the cache do not include the second merged identifier: creating the merged access control information for the other object by merging the first access control information and the second access control information; adding the second merged identifier and the merged access control information to the entry in the cache; and storing the other object in the directory with another pointer that associates the other object with the merged access control information in the entry in the cache.

Example Clause I, the method of any one of Example Clauses A through H, further comprising creating the cache based on an instruction to copy a directory tree within which the directory is located to storage.

Example Clause J, a system comprising: a processing system; a file system; and computer-readable storage media storing instructions that, when executed, cause the file system to perform operations comprising: receiving, from an application, a request to store an object in a directory, wherein the object is associated with a first identifier representing first access control information and a second identifier representing second access control information; creating, for the object, a first merged identifier based on the first identifier and the second identifier; determining that an entry in a cache includes a second merged identifier that matches the first merged identifier; in response to determining that the entry in the cache includes the second merged identifier, associating the object with merged access control information in the entry in the cache using a pointer, wherein: the merged access control information is based on the first access control information and the second access control information; and the merged access control information is associated with another object; and storing the object in the directory with the pointer.

Example Clause K, the system of Example Clause J, wherein the first access control information is derived from a token associated with a user of the application from which the request is received.

Example Clause L, the system of Example Clause J or Example Clause K, wherein the second access control information is inherited from the directory in which the object is stored.

Example Clause M, the system of any one of Example Clauses J through L, wherein creating the first merged identifier comprises: providing the first identifier and second identifier as inputs to a hash algorithm; and receiving the first merged identifier as an output from the hash algorithm.

Example Clause N, the system of Example Clause M, wherein the inputs include an indicator that the object is a directory and not a file.

Example Clause O, the system of any one of Example Clauses J through N, wherein: the object is associated with a third identifier representing third access control information; the merged access control information is created by merging the first access control information, the second access control information, and the third access control information; and the first merged identifier is created based on the first identifier, the second identifier, and the third identifier.

Example Clause P, the system of Example Clause O, wherein the third access control information is defined by a user of the application from which the request is received.

Example Clause Q, the system of any one of Example Clauses J through P, wherein the operations further comprise: receiving, from the application, a prior request to store the other object in the directory, wherein the other object is associated with the first identifier representing the first access control information and the second identifier representing the second access control information; creating, for the other object, the second merged identifier based on the first identifier and the second identifier; determining that entries in the cache do not include the second merged identifier; in response to determining that the entries in the cache do not include the second merged identifier: creating the merged access control information for the other object by merging the first access control information and the second access control information; adding the second merged identifier and the merged access control information to the entry in the cache; and storing the other object in the directory with another pointer that associates the other object with the merged access control information in the entry in the cache.

Example Clause R, the system of any one of Example Clauses J through Q, wherein the operations further comprise creating the cache based on an instruction to copy a directory tree within which the directory is located to storage.

Example Clause S, computer-readable storage media storing instructions that, when executed by a processing system, cause a file system to perform operations comprising: receiving, from an application, a request to store an object in a directory, wherein the object is associated with a first identifier representing first access control information and a second identifier representing second access control information; creating, for the object, a first merged identifier based on the first identifier and the second identifier; determining that an entry in a cache includes a second merged identifier that matches the first merged identifier; in response to determining that the entry in the cache includes the second merged identifier, associating the object with merged access control information in the entry in the cache using a pointer, wherein: the merged access control information is based on the first access control information and the second access control information; and the merged access control information is associated with another object; and storing the object in the directory with the pointer.

Example Clause T, the computer-readable storage media of Example Clause S, wherein: the first access control information is derived from a token associated with a user of the application from which the request is received; the second access control information is inherited from the directory in which the object is stored; and creating the first merged identifier comprises: providing the first identifier and second identifier as inputs to a hash algorithm; and receiving the first merged identifier as an output from the hash algorithm.

While certain example embodiments have been described, these embodiments have been presented by way of example only, and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different identifiers, two different types of access control information).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
   a processing system;
   a file system; and
   computer-readable storage media storing instructions that, when executed, cause the file system to perform operations comprising:
      receiving, from an application, a request to store an object in a directory, wherein the object is associated with a first identifier representing first access control information and a second identifier representing second access control information;
      creating, for the object, a first merged identifier based on the first identifier and the second identifier;

determining that an entry in a cache includes a second merged identifier that matches the first merged identifier;

in response to determining that the entry in the cache includes the second merged identifier, associating the object with merged access control information in the entry in the cache using a pointer, wherein:

the merged access control information is based on the first access control information and the second access control information; and the merged access control information is associated with another object; and storing the object in the directory with the pointer.

2. The system of claim 1, wherein the first access control information is derived from a token associated with a user of the application from which the request is received.

3. The system of claim 1, wherein the second access control information is inherited from the directory in which the object is stored.

4. The system of claim 1, wherein creating the first merged identifier comprises:

providing the first identifier and second identifier as inputs to a hash algorithm; and receiving the first merged identifier as an output from the hash algorithm.

5. The system of claim 4, wherein the inputs include an indicator that the object is a directory and not a file.

6. The system of claim 1, wherein:

the object is associated with a third identifier representing third access control information;

the merged access control information is created by merging the first access control information, the second access control information, and the third access control information; and the first merged identifier is created based on the first identifier, the second identifier, and the third identifier.

7. The system of claim 6, wherein the third access control information is defined by a user of the application from which the request is received.

8. The system of claim 1, wherein the operations further comprise:

receiving, from the application, a prior request to store the other object in the directory, wherein the other object is associated with the first identifier representing the first access control information and the second identifier representing the second access control information;

creating, for the other object, the second merged identifier based on the first identifier and the second identifier;

determining that entries in the cache do not include the second merged identifier;

in response to determining that the entries in the cache do not include the second merged identifier:

creating the merged access control information for the other object by merging the first access control information and the second access control information;

adding the second merged identifier and the merged access control information to the entry in the cache; and storing the other object in the directory with another pointer that associates the other object with the merged access control information in the entry in the cache.

9. The system of claim 1, wherein the operations further comprise creating the cache based on an instruction to copy a directory tree within which the directory is located to storage.

10. A method to avoid redundant merges of different types of access control information in a file system, comprising:

receiving, from an application, a request to store an object in a directory, wherein the object is associated with a first identifier representing first access control information and a second identifier representing second access control information;

creating, for the object, a first merged identifier based on the first identifier and the second identifier;

determining that an entry in a cache includes a second merged identifier that matches the first merged identifier;

in response to determining that the entry in the cache includes the second merged identifier, associating the object with merged access control information in the entry in the cache using a pointer, wherein:

the merged access control information is based on the first access control information and the second access control information; and the merged access control information is associated with another object; and storing the object in the directory with the pointer.

11. The method of claim 10, wherein the first access control information is associated with a user of the application from which the request is received.

12. The method of claim 10, wherein the second access control information is inherited from the directory in which the object is stored.

13. The method of claim 10, wherein creating the first merged identifier comprises:

providing the first identifier and second identifier as inputs to a hash algorithm; and receiving the first merged identifier as an output from the hash algorithm.

14. The method of claim 13, wherein the inputs include an indicator that the object is a directory and not a file.

15. The method of claim 10, wherein:

the object is associated with a third identifier representing third access control information;

the merged access control information is created by merging the first access control information, the second access control information, and the third access control information; and the first merged identifier is created based on the first identifier, the second identifier, and the third identifier.

16. The method of claim 15, wherein the third access control information is defined by a user of the application from which the request is received.

17. The method of claim 10, further comprising:

receiving, from the application, a prior request to store the other object in the directory, wherein the other object is associated with the first identifier representing the first access control information and the second identifier representing the second access control information;

creating, for the other object, the second merged identifier based on the first identifier and the second identifier;

determining that entries in the cache do not include the second merged identifier;

in response to determining that the entries in the cache do not include the second merged identifier:

creating the merged access control information for the other object by merging the first access control information and the second access control information;

adding the second merged identifier and the merged access control information to the entry in the cache; and storing the other object in the directory with another pointer that associates the other object with the merged access control information in the entry in the cache.

18. The method of claim 10, further comprising creating the cache based on an instruction to copy a directory tree within which the directory is located to storage.

19. Computer-readable storage media storing instructions that, when executed by a processing system, cause a file system to perform operations comprising:
   receiving, from an application, a request to store an object in a directory, wherein the object is associated with a first identifier representing first access control information and a second identifier representing second access control information;
   creating, for the object, a first merged identifier based on the first identifier and the second identifier;
   determining that an entry in a cache includes a second merged identifier that matches the first merged identifier;
   in response to determining that the entry in the cache includes the second merged identifier, associating the object with merged access control information in the entry in the cache using a pointer, wherein:
      the merged access control information is based on the first access control information and the second access control information; and
      the merged access control information is associated with another object; and
   storing the object in the directory with the pointer.

20. The computer-readable storage media of claim 19, wherein:
   the first access control information is derived from a token associated with a user of the application from which the request is received;
   the second access control information is inherited from the directory in which the object is stored; and
   creating the first merged identifier comprises:
      providing the first identifier and second identifier as inputs to a hash algorithm; and
      receiving the first merged identifier as an output from the hash algorithm.

* * * * *